(12) United States Patent
Roberts

(10) Patent No.: US 11,856,347 B1
(45) Date of Patent: Dec. 26, 2023

(54) SPEAKER STAND

(71) Applicant: David M. Roberts, Saint Paul, MN (US)

(72) Inventor: David M. Roberts, Saint Paul, MN (US)

( * ) Notice: Subject to any disclaimer, the term of this patent is extended or adjusted under 35 U.S.C. 154(b) by 335 days.

(21) Appl. No.: 17/152,784

(22) Filed: Jan. 19, 2021

Related U.S. Application Data

(60) Provisional application No. 62/962,185, filed on Jan. 16, 2020.

(51) Int. Cl.
*H04R 1/02* (2006.01)
*F16M 11/10* (2006.01)

(52) U.S. Cl.
CPC ............ *H04R 1/026* (2013.01); *F16M 11/10* (2013.01); *H04R 1/025* (2013.01); *F16M 2200/066* (2013.01); *F16M 2200/08* (2013.01); *H04R 2201/025* (2013.01)

(58) Field of Classification Search
CPC .. H04R 1/026; H04R 1/025; H04R 2201/025; F16M 11/10; F16M 2200/066; F16M 2200/08
USPC ......................................................... 381/387
See application file for complete search history.

(56) References Cited

U.S. PATENT DOCUMENTS

| | | |
|---|---|---|
| 250,291 A | 11/1881 | Seely |
| 275,050 A | 4/1883 | Keller |
| 964,353 A | 7/1910 | Whittier |
| 1,517,251 A | 12/1924 | Schaaf |
| 1,593,415 A | 7/1926 | Perkins |
| 1,610,414 A | 12/1926 | Bernard et al. |
| 1,611,903 A | 12/1926 | Gelb |
| 1,625,266 A | 4/1927 | Mast |
| 1,663,356 A | 3/1928 | Smith |
| 1,721,690 A | 7/1929 | Daniele |
| 1,780,039 A | 10/1930 | Pechan |
| 1,863,756 A | 6/1932 | Lufkin |
| 1,942,925 A | 1/1934 | Jenkins |
| 2,083,091 A | 6/1937 | Rector |
| 2,110,037 A | 3/1938 | Rosa |
| 2,111,368 A | 3/1938 | Kron |
| 2,113,852 A | 4/1938 | Meade |
| 2,129,898 A | 9/1938 | Wright |
| 2,170,006 A | 8/1939 | Brandt |
| 2,179,840 A | 11/1939 | Bucky |
| 2,263,668 A | 11/1941 | Woodworth |

(Continued)

*Primary Examiner* — Sean H Nguyen
(74) *Attorney, Agent, or Firm* — Albert W. Watkins

(57) ABSTRACT

A speaker stand has a base, an upright, and one or more quick release speaker couplers. The base has a plurality of arms, anchors, and optional removable stability plates. The upright has a lower vertical riser defining a first vertical riser longitudinal axis, an upper vertical riser parallel with and axially offset from the first vertical riser longitudinal axis, and an angled intermediate riser connecting the lower and upper vertical risers together. The quick release speaker coupler suspends a loudspeaker enclosure bracket to the upper vertical riser even when not clamped thereto, while providing three displaced axes of rotation for the loudspeaker enclosure, two that are parallel to the lower vertical riser longitudinal axis and one angularly offset thereto, and at least one axis of reciprocation. The radial offset of the loudspeaker from the upper vertical riser centers the mass of the loudspeaker enclosure with the base.

19 Claims, 5 Drawing Sheets

(56) References Cited

U.S. PATENT DOCUMENTS

| | | |
|---|---|---|
| 2,278,250 A | 3/1942 | Diesbach |
| 2,292,140 A | 8/1942 | Lofgren |
| 2,299,683 A | 10/1942 | Curtis |
| 2,366,950 A | 1/1945 | Wright |
| 2,479,720 A | 8/1949 | Brandt |
| 2,481,717 A | 9/1949 | Blair |
| 2,527,436 A | 10/1950 | Masterson |
| 2,532,173 A | 11/1950 | Lewis |
| 2,613,901 A | 10/1952 | Tatar |
| 2,613,902 A | 10/1952 | Loken |
| 2,630,289 A | 3/1953 | Selig |
| 2,634,075 A | 4/1953 | Mayzel |
| 2,691,501 A | 10/1954 | Spencer |
| 2,723,431 A | 11/1955 | Di Renzo |
| 2,760,744 A | 8/1956 | Watrous |
| 2,780,282 A | 2/1957 | Cox, Jr. |
| 2,873,079 A | 2/1959 | Carogana et al. |
| 2,970,798 A | 2/1961 | Fritchle et al. |
| 3,028,133 A | 4/1962 | Craig |
| 3,074,748 A | 1/1963 | Ulrich |
| 3,180,602 A | 4/1965 | Monell |
| 3,232,613 A | 2/1966 | Laube, Jr. |
| 3,239,874 A | 3/1966 | Sperzel |
| 3,357,041 A | 12/1967 | Brueder |
| 3,436,482 A | 4/1969 | Pless et al. |
| 3,454,252 A | 7/1969 | Morgan et al. |
| 3,486,514 A | 12/1969 | Prescott |
| 3,698,328 A | 10/1972 | Weir |
| 3,783,262 A | 1/1974 | Pile |
| 3,789,213 A | 1/1974 | Sonneman |
| 3,790,773 A | 2/1974 | Sapper |
| 3,911,221 A | 10/1975 | Wong |
| 3,994,464 A | 11/1976 | Perbal et al. |
| 4,258,708 A | 3/1981 | Gentile |
| 4,364,535 A | 12/1982 | Itoh et al. |
| 4,396,807 A | 8/1983 | Brewer |
| 4,405,107 A | 9/1983 | Clyburn |
| 4,407,472 A | 10/1983 | Beck |
| 4,465,255 A | 8/1984 | Hill |
| D281,317 S | 11/1985 | Whitaker |
| 4,592,797 A | 6/1986 | Carlson |
| 4,596,484 A | 6/1986 | Nakatani |
| 4,671,478 A | 6/1987 | Schoenig et al. |
| 4,671,479 A | 6/1987 | Johnson et al. |
| 4,712,762 A | 12/1987 | Liedle |
| 4,715,571 A | 12/1987 | Soltow et al. |
| 4,765,580 A | 8/1988 | Wright |
| 4,773,621 A | 9/1988 | Gebhardt |
| 4,782,428 A | 11/1988 | Lowell et al. |
| 4,840,345 A | 6/1989 | Neil |
| 4,900,184 A | 2/1990 | Cleveland |
| 4,905,946 A | 3/1990 | Wang |
| 4,923,156 A | 5/1990 | Linneusson |
| 4,953,223 A | 8/1990 | Householder |
| 4,993,961 A | 2/1991 | Hisatomi et al. |
| 5,060,894 A | 10/1991 | Hillinger |
| 5,082,222 A | 1/1992 | Hsu |
| 5,102,079 A | 4/1992 | Lee |
| 5,112,046 A | 5/1992 | Thorpe |
| 5,124,857 A | 6/1992 | Pitz |
| 5,126,928 A | 6/1992 | Hughes |
| 5,137,237 A | 8/1992 | Haskins |
| 5,146,808 A | 9/1992 | Hoshino |
| 5,154,381 A | 10/1992 | Malinao |
| 5,156,508 A | 10/1992 | Grisley |
| 5,192,963 A | 3/1993 | Hill |
| 5,201,896 A | 4/1993 | Kruszewski |
| 5,320,312 A | 6/1994 | Hoenninger |
| 5,340,066 A | 8/1994 | Ditch |
| 5,340,068 A | 8/1994 | Sarkisian et al. |
| 5,464,083 A | 11/1995 | Arnold et al. |
| D365,099 S | 12/1995 | Smith et al. |
| D366,169 S | 1/1996 | Huang |
| 5,490,599 A | 2/1996 | Tohidi |
| 5,501,419 A | 3/1996 | Huang |
| 5,503,356 A | 4/1996 | Shelby |
| 5,542,505 A | 8/1996 | Kempf |
| 5,558,501 A | 9/1996 | Wang et al. |
| 5,611,508 A | 3/1997 | Palmero |
| 5,638,579 A | 6/1997 | Tenney |
| D383,927 S | 9/1997 | Vassallo |
| 5,697,125 A | 12/1997 | Gannon |
| D392,973 S | 3/1998 | Fenner et al. |
| 5,739,447 A | 4/1998 | Hoshino |
| 5,745,584 A | 4/1998 | Taylor |
| 5,757,943 A | 5/1998 | Arledge, Jr. |
| 5,769,556 A | 6/1998 | Colley |
| 5,771,539 A | 6/1998 | Wahlstedt et al. |
| 5,771,540 A | 6/1998 | Carpenter et al. |
| D395,892 S | 7/1998 | Solomon |
| 5,787,549 A | 8/1998 | Soderlund |
| 5,806,819 A | 9/1998 | Martone |
| 5,876,011 A | 3/1999 | Blasing |
| 5,946,874 A | 9/1999 | Roberts |
| 5,947,706 A | 9/1999 | Gapinski |
| 6,007,032 A | 12/1999 | Kuo |
| 6,072,880 A | 6/2000 | Shipps et al. |
| 6,084,549 A | 7/2000 | Pensjo et al. |
| 6,101,261 A | 8/2000 | Brown, Sr. et al. |
| 6,101,678 A | 8/2000 | Malloy et al. |
| 6,131,868 A | 10/2000 | Welling et al. |
| D434,028 S | 11/2000 | Defazio |
| 6,154,553 A | 11/2000 | Taylor |
| 6,157,729 A | 12/2000 | LeBlanc |
| 6,182,580 B1 | 2/2001 | Barrett et al. |
| 6,241,552 B1 | 6/2001 | Pan |
| 6,305,659 B1 | 10/2001 | Metelski |
| 6,328,269 B1 | 12/2001 | Krautloher |
| 6,332,621 B1 | 12/2001 | Wu |
| 6,347,776 B1 | 2/2002 | Chuang |
| 6,367,749 B2 | 4/2002 | Valiulis |
| 6,375,135 B1 | 4/2002 | Eason et al. |
| 6,386,413 B1 | 5/2002 | Twyford |
| 6,480,613 B1 | 11/2002 | Choi |
| 6,481,913 B2 | 11/2002 | Chen |
| 6,487,298 B1 | 11/2002 | Hacker |
| 6,504,707 B2 | 1/2003 | Agata et al. |
| 6,530,123 B1 | 3/2003 | Wahlstedt |
| 6,651,943 B1 | 11/2003 | Cho et al. |
| 6,662,731 B2 | 12/2003 | Teppo et al. |
| 6,783,462 B1 | 8/2004 | Costain |
| D497,904 S | 11/2004 | Dardashti |
| 6,814,332 B2 | 11/2004 | Eason |
| 7,048,241 B2 | 5/2006 | Crain et al. |
| 7,100,879 B2 | 9/2006 | Podue et al. |
| 7,147,191 B2 | 12/2006 | Ichikawa et al. |
| 7,207,532 B1 | 4/2007 | Roberts et al. |
| 7,207,537 B2 | 4/2007 | Hung |
| 7,232,098 B2 | 6/2007 | Rawlings et al. |
| 7,240,881 B2 | 7/2007 | Crain et al. |
| 7,320,450 B2 | 1/2008 | Carnevali |
| 7,369,672 B2 | 5/2008 | Hirschhorn |
| 7,389,965 B2 | 6/2008 | Oddsen, Jr. et al. |
| 7,441,630 B1 | 10/2008 | Herrington et al. |
| 7,455,271 B2 | 11/2008 | Pincek et al. |
| 7,514,619 B1 | 4/2009 | Bruce |
| 7,523,906 B2 | 4/2009 | Bennett |
| 7,635,109 B1 | 12/2009 | Roberts et al. |
| 7,669,817 B2 | 3/2010 | Scott |
| D619,123 S | 7/2010 | Lau |
| 7,770,859 B2 | 8/2010 | Costabel et al. |
| 7,819,367 B1 | 10/2010 | Roberts et al. |
| 7,832,803 B2 | 11/2010 | Cassaday |
| 7,886,867 B2 | 2/2011 | Adams |
| 8,016,253 B1 | 9/2011 | Yu |
| 8,047,482 B2 | 11/2011 | Poncon et al. |
| 8,066,232 B2 | 11/2011 | Wills et al. |
| D653,066 S | 1/2012 | Henderson |
| 8,111,865 B2 | 2/2012 | Lau |
| 8,116,497 B2 | 2/2012 | Li |
| 8,118,272 B2 | 2/2012 | Liou |
| 8,122,629 B2 | 2/2012 | Cowgill |
| 8,136,780 B2 | 3/2012 | Lin |
| 8,141,834 B2 | 3/2012 | Mueller |

(56) References Cited

U.S. PATENT DOCUMENTS

| | | | |
|---|---|---|---|
| 8,152,402 B2 | 4/2012 | Wylde et al. | |
| 8,226,053 B2 | 7/2012 | Yu | |
| 8,235,334 B1 | 8/2012 | Kobal | |
| 8,240,628 B2 | 8/2012 | Huang | |
| D668,495 S | 10/2012 | Henderson | |
| 8,276,867 B2 | 10/2012 | Hung | |
| 8,331,598 B2 | 12/2012 | Li | |
| 8,342,468 B1 | 1/2013 | Strickland | |
| 8,459,599 B2 | 6/2013 | Du et al. | |
| 8,469,323 B1 | 6/2013 | Deros et al. | |
| 8,469,325 B2 | 6/2013 | Yu | |
| 8,488,306 B2 | 7/2013 | Mickey et al. | |
| 8,511,422 B2 | 8/2013 | Adams | |
| 8,523,476 B2 | 9/2013 | Billings | |
| 8,636,257 B2 | 1/2014 | Tsou et al. | |
| 8,675,906 B2 | 3/2014 | Lau | |
| 8,727,290 B1 | 5/2014 | De La Matta et al. | |
| 8,800,942 B2 | 8/2014 | Yu | |
| 8,833,716 B2 | 9/2014 | Funk et al. | |
| 8,864,089 B2 | 10/2014 | Hung | |
| 8,875,348 B2 | 11/2014 | Kossett | |
| 8,918,931 B1 | 12/2014 | Baker et al. | |
| D740,253 S | 10/2015 | Jeon et al. | |
| 9,167,192 B2 | 10/2015 | Eoh | |
| 9,516,400 B1 | 12/2016 | Roberts et al. | |
| 9,933,001 B2 | 4/2018 | Gardiner | |
| 10,584,824 B1 | 3/2020 | Roberts et al. | |
| 2002/0066837 A1 | 6/2002 | Dunbar | |
| 2004/0135040 A1 | 7/2004 | Eason | |
| 2005/0151039 A1 | 7/2005 | Hsu | |
| 2005/0161561 A1 | 7/2005 | Hsieh | |
| 2006/0120550 A1 | 6/2006 | McCann | |
| 2007/0107580 A1 | 5/2007 | Vleugels | |
| 2007/0212162 A1 | 9/2007 | Schank et al. | |
| 2007/0234517 A1 | 10/2007 | Larson et al. | |
| 2007/0278050 A1 | 12/2007 | Larson et al. | |
| 2008/0253601 A1 | 10/2008 | Hilderman | |
| 2008/0303275 A1 | 12/2008 | Johnson | |
| 2011/0167986 A1 | 7/2011 | Hennessey | |
| 2011/0197803 A1 | 8/2011 | May | |
| 2012/0049024 A1 | 3/2012 | Smith | |
| 2012/0144974 A1* | 6/2012 | May | G10G 5/005 84/387 A |
| 2012/0170194 A1 | 7/2012 | Lord et al. | |
| 2014/0059805 A1 | 3/2014 | Krahn et al. | |
| 2014/0151516 A1* | 6/2014 | Liu | H04R 1/026 248/124.1 |
| 2014/0232104 A1 | 8/2014 | Bernardi | |
| 2014/0374550 A1 | 12/2014 | Straeter | |
| 2015/0102187 A1 | 4/2015 | Hennessey | |
| 2015/0365752 A1 | 12/2015 | Mcintosh | |
| 2016/0053934 A1 | 2/2016 | Hennessey | |
| 2016/0091134 A1* | 3/2016 | May | G10D 13/02 248/404 |

\* cited by examiner

SPEAKER STAND

CROSS REFERENCE TO RELATED APPLICATIONS

The present application claims the benefit of U.S. provisional patent application 62/962,185 filed Jan. 16, 2020 of like title and inventorship, the teachings and entire contents which are incorporated herein by reference.

BACKGROUND OF THE INVENTION

1. Field of the Invention

This invention pertains generally to electro-acoustic signal processing systems and devices, and more particularly to a housed loudspeaker mounting support. In one particular manifestation, the invention comprises one or more loudspeakers enclosed within an enclosure, casing, shell, or the like, and a mounting support to hold and precisely direct the loudspeaker during operation.

2. Description of the Related Art

Loudspeakers convert electrical energy into audible sounds. The technology to do so is both diverse, and, in many cases, well known. A loudspeaker may, for exemplary and non-limiting purpose, comprise a powerful cylindrical magnet, a voice coil around one end of the cylindrical magnet and generally reciprocating along an axis parallel to the cylindrical magnet's longitudinal axis, and a speaker cone extending from the voice coil to some type of support. As the voice coil moves, generally reciprocal motion is induced in the speaker cone. The speaker cone in turn creates perturbations in the surrounding air, thereby generating the sound waves. As noted, there are many other types of loudspeakers, each that convert electrical energy into these perturbations in the air that people recognize as sound waves.

Over time, various enclosures or housings have been devised that not only support a loudspeaker, for exemplary purposes thereby providing the support for the part of the speaker cone distal to the cylindrical magnet, but through the design also emphasizing certain parts of the range of sounds that a person can hear, de-emphasizing others, and in some cases even providing other very specialized functions. Much science is behind the design and configuration of many loudspeakers and speaker enclosures, that, while beyond the scope of the present invention, must necessarily be respected in the development of a sound stage.

Even though the loudspeaker is housed within a speaker enclosure, placement of the speaker enclosure is also known to critically affect sound perception at different locations. This is not only due to direct transmission of the sound wave from one or many loudspeakers to a person's ears, but also due to various reflections of sound waves that occur with most surfaces and objects.

Many early speaker enclosures were designed to simply rest upon the floor or ground, with sound waves emanating therefrom. Unfortunately, obstacles also tend to rest upon the floor or ground, and so can seriously interfere with the quality of sound perceived by listeners at some locations. For exemplary and non-limiting purpose, very low frequency sound and sub-acoustic waves tend to disperse well even in the presence of some obstacles. In contrast, a row of obstacles which could include furniture or people will usually substantially diminish or alter higher frequency sound waves.

In consideration thereof, artisans have designed various stands and brackets to lift speaker enclosures up above the ground or floor level. One of the advantages is, as suggested above, to avoid interference from the possibility of ground or floor level obstacles. This can be particularly consequential in the case of theatrical or musical performances, whether live or pre-recorded, where a large crowd may gather. In such cases, ground-level loudspeakers will produce sound waves that may be nearly entirely absorbed by the first few rows of people. Instead, most venues use the various stands and brackets to elevate the speaker enclosures, and point the speaker enclosures toward the crowd from above. This has worked well, particularly in consideration of the fact that a person's ears are located very nearly at the top of their body, meaning sound waves coming from an elevated angle are unlikely to encounter much in the way of consequential interference, diminution or other adverse interaction.

A number of brackets have been designed over the years that support speakers from various elevated surfaces and objects. Exemplary U.S. patents, the teachings which are incorporated herein by reference, include: U.S. Pat. No. 5,201,896 by Kruszewski, entitled "Universal audio speaker mounting bracket"; U.S. Pat. No. 5,757,943 by Arledge, entitled "Movable boom mounting device"; U.S. Pat. No. 6,101,261 by Brown et al, entitled "Variable tilt loud speaker enclosure"; U.S. Pat. No. 6,347,776 by Chuang, entitled "Multi-directional mounting bracket"; U.S. Pat. No. 7,100,879 by Podue et al, entitled "Speaker bracket"; U.S. Pat. No. 7,455,271 by Pincek et al, entitled "Method and apparatus for adjustably mounting a speaker"; U.S. Pat. No. 7,523,906 by Bennett, entitled "Loudspeaker wall bracket"; U.S. Pat. No. 7,669,817 by Scott, entitled "Mounting bracket"; U.S. Pat. No. 8,111,865 by Lau, entitled "Flat panel speaker mounting system"; U.S. Pat. No. 8,141,834 by Mueller, entitled "Test head positioning system"; U.S. Pat. No. 8,276,867 by Hung, entitled "Adjustable projector bracket assembly"; U.S. Pat. No. 8,469,323 by Deros et al, entitled "Modular monitor support assembly"; U.S. Pat. No. 8,488,306 by Mickey et al, entitled "Secondary computing device display system"; U.S. Pat. No. 8,675,906 by Lau, entitled "Flat panel speaker mounting system with remote operation"; U.S. Des Pat. No. 281,317 by Whitaker, entitled "Wall mounted support for loudspeaker or the like"; U.S. Des Pat. No. 395,892 by Solomon, entitled "Universal speaker mounting device"; and U.S. Des Pat. No. 619,123 by Lau, entitled "Futuristic robot speaker holder".

Stands, which will be understood herein as a horizontally supporting base with an article support vertically rising from the base, are used to support many diverse items. Lights, microphones, loudspeakers, cameras, and many other electrical and non-electrical items too numerous to individually list herein are supported thereon. Most commonly, the item to be supported will preferably be easily relocated, as will the stand.

A number of stands have been designed over the years that support speakers and other objects from various elevated positions. One group of these stands allow the height of the speaker enclosure to be adjusted. Exemplary U.S. patents, the teachings which are incorporated herein by reference, include: U.S. Pat. No. 2,179,840 by Bucky, entitled "Loudspeaker arrangement"; U.S. Pat. No. 4,953,223 by Householder, entitled "Speaker mounting system"; and U.S. Pat. No. 6,487,298 by Hacker, entitled "Microphone stand sound monitor". Of particular noteworthiness, the Householder U.S. Pat. No. 4,953,223 also supports a plurality of speaker enclosures vertically upon a single stand. Nevertheless, the geometry required for a speaker enclosure to be supported upon the Householder stand is very specific, eliminating most of the wide array of enclosures explicitly designed to provide acoustic benefit.

Unfortunately, modern loudspeakers tend to be very massive, and linear poles tend to be quite unstable. Some artisans have designed loudspeaker stands that are non-linear, some which benefit balance and stability and others for more artistic and decorative purpose. Exemplary U.S. patents, the teachings which are incorporated herein by reference, include: U.S. Pat. No. 3,911,221 by Wong, entitled "Speaker support system"; U.S. Pat. No. 4,765,580 by Wright, entitled "Loudspeaker support"; U.S. Pat. No. 7,886,867 by Adams, entitled "Flexible multiple speaker support apparatus"; U.S. Pat. No. 8,511,422 by Adams, entitled "Flexible multiple speaker support apparatus"; U.S. Des Pat. No. 365,099 by Smith et al, entitled "Outdoor speaker"; U.S. Des Pat. No. 392,973 by Fenner et al, entitled "Combined loudspeaker and stand"; U.S. Des Pat. No. 497,904 by Dardashti, entitled "Speaker stand"; and U.S. Des Pat. No. 740,253 by Jeon et al, entitled "Speaker".

A few artisans have designed speaker stands that are both non-linear and height adjustable, though as will become very apparent upon inspection, for very different purpose and benefit from that provided by the present invention. Exemplary U.S. patents, the teachings which are incorporated herein by reference, include: U.S. Pat. No. 5,745,584 by Taylor, entitled "Sound bubble structures for sound reproducing arrays"; U.S. Pat. No. 6,154,553 by Taylor, entitled "Sound bubble structures for sound reproducing arrays"; U.S. Pat. No. 6,480,613 by Choi, entitled "Loudspeaker stand"; U.S. Pat. No. 7,369,672 by Hirschhorn, entitled "Personal audio visual system"; U.S. Pat. No. 7,441,630 by Herrington et al, entitled "Multi-driver speaker system"; U.S. Pat. No. 8,066,232 by Wills et al, entitled "Flat-screen monitor support"; U.S. Pat. No. 8,116,497 by Li, entitled "Portable speaker system for outdoor umbrella"; U.S. Pat. No. 8,331,598 by Li, entitled "Audio system for outdoor umbrella"; and U.S. Des Pat. No. 434,028 by DeFazio, entitled "Surround-sound speaker stand".

One of the major factors which controls the applications for which a stand may be used is the couplings used therein. Heretofore in the prior art, one such connection was made as a simple solid connection by thumbscrew or the like to pull two flat surfaces together. This type of connection had almost no resistance to pivotal forces, since the measure of forces upon an arm are calculated by not only the force applied, but also by the distance from the point of rotation. Consequently, when even a small force is applied at a great distance such as at or near the end of a boom arm, the force is magnified by the multiple of relative distance from pivot. Said another way, a first force applied at ten times the distance from a pivot as a second point would require ten times the first force to be applied in an opposite direction at the second point to cancel the first force. In the case of a small knuckle serving as the pivot, this knuckle may be hundreds or even thousands of times closer to the pivot than the end of the boom, and consequently require hundreds or thousands of times the force to prevent rotation about the pivotal axis. As is known in the industry, all too often even minor forces of only a few pounds at the end of a stand or arm link overcome the resistance at the knuckle, since these few pounds require thousands of pounds of force to stop such rotation. As a result, the few pounds of force cause the stand to realign undesirably, and therefore require all too frequent re-alignment.

Several different approaches have been attempted to overcome the inherent limitations of these small knuckles or flexible joints. One such approach is illustrated in U.S. Pat. No. 4,671,478 by Schoenig et al, entitled "Boom assembly and components thereof", the contents which are incorporated herein by reference. As illustrated therein, the knuckle may comprise two discs designed to mate together at surfaces that are rippled in a complementary radial pattern about the pivot point. As long as both surfaces have complementary geometries, then the engagement of the ridges on one surface occur within the valleys of the opposing surface. To rotate the joint, one must first loosen a bolt passing through the pivot point, to allow the two surfaces to climb up ridge to ridge before passing into the next complementary ridge-valley spacing. When the most desirable ridge-to-valley position is located, then the bolt passing through the pivotal axis may be tightened to prevent any further movement. Since any rotation would require a spreading of the two surfaces, this type of connection frequently has substantial strength and rigidity, so long as the bolt through the pivotal axis is kept secure. Unfortunately, and owing to the discontinuous nature of the engaging surfaces, movement of such a pivotal joint is precarious. Said another way, when the bolt holding the two surfaces tightly in engagement is loosened just beyond the point required to permit ridge-peak to ridge-peak contact between the two surfaces, then all resistance is suddenly and instantaneously lost, and the boom is entirely free to move and drop. So, in order to obtain rotary movement, there is no ability to gradually reduce the frictional forces, but instead the movement occurs instantaneously and sometimes without warning. A number of additional patents illustrate the various techniques that have been tried with these relatively small knuckles, including U.S. Pat. No. 2,532,173 by Lewis, entitled "Microphone stand"; U.S. Pat. No. 5,146,808 by Hoshino, entitled "Angle adjusting mechanism for an article support"; and 2002/0066837 by Dunbar, entitled "Portable Music Performance Stand", the contents of each which are incorporated herein by reference.

Other artisans have proposed addressing the force amplification or leveraging by providing an anchoring or locking arrangement which circumscribes the pivotal axis, but which is displaced therefrom by some radial distance. Exemplary of such an arrangement is U.S. Pat. No. 2,527,436 by Masterson, entitled "Protecting system for camera viewing areas", the contents which are incorporated herein by reference. While this arrangement requires somewhat more space than the knuckle would, the relative distances between pivot and boom end versus pivot and locking point are substantially reduced, and then the amount of force and also the amount of ingenuity required to operate the device tend to be better kept in check. Nevertheless, these arrangements still place significant forces upon a small thumbscrew or the like, and such arrangement will invariably fail when relatively meager forces are applied at the ends of the boom. Additional patents which illustrate this type of mount include U.S. Pat. No. 1,517,251 by Schaaf, entitled "Adjustable work-supporting stand"; U.S. Pat. No. 1,611,903 by Gelb, entitled "Adjustable lamp support"; U.S. Pat. No. 2,129,898 by Wright, entitled "Microphone boom"; U.S. Pat. No. 2,278,250 by Diesbach, entitled "Telescope support"; U.S. Pat. No. 2,299,683 by Curtis, entitled "Trouble light"; U.S. Pat. No. 2,366,950 by Wright, entitled "Microphone boom"; U.S. Pat. No. 2,481,717 by Blair, entitled "Tilting tripod head"; U.S. Pat. No. 4,773,621 by Gebhardt, entitled "Adjustable appliance positioning mechanism"; U.S. Pat. No. 6,332,621 by Wu, entitled "Folding structure for a skate board scooter"; and U.S. Pat. No. 6,481,913 by Chen, entitled "Front tube pressing device of scooter", the contents of each which are incorporated herein by reference.

A variety of other pole clamps have also been devised for suspending a variety of devices and apparatus from poles. Exemplary U.S. patents, the teachings which are incorporated herein by reference, include: U.S. Pat. No. 250,291 by Seely, entitled "Telephone stand"; U.S. Pat. No. 4,405,107 by Clyburn, entitled "Clamp system for telescoping tubes"; U.S. Pat. No. 6,072,880 by Shipps et al, entitled "Modular active silencer with port dish"; U.S. Pat. No. 6,157,729 by LeBlanc, entitled "Anti-theft boat speaker brackets"; U.S. Pat. No. 6,328,269 by Krautloher, entitled "Orientation device"; U.S. Pat. No. 6,375,135 by Eason et al, entitled "High strength engineered collapsible tripod"; U.S. Pat. No. 6,814,332 by Eason, entitled "Microphone support boom movement control apparatus and method with differential motion isolation capability"; U.S. Pat. No. 7,770,859 by Costabel et al, entitled "Holding element for fastening an equipment element to a supporting rail"; U.S. Pat. No. 8,016,253 by Yu, entitled "Stepless adjustable musical instrument stand"; U.S. Pat. No. 8,047,482 by Poncon et al, entitled "Lock for fixation device"; U.S. Pat. No. 8,226,053 by Yu, entitled "Musical instrument stand that is operated smoothly and stably and is adjusted quickly"; U.S. Pat. No. 8,342,468 by Strickland, entitled "Drink container holding device"; and U.S. Pat. No. 8,469,325 by Yu, entitled "Musical instrument stand with an angle adjustment function".

Unfortunately, in the high-end acoustic applications, vibrations and resonances that can be induced in the stand can seriously interfere with the sound quality. This is particularly challenging as the frequencies of sound generated by a loudspeaker spread through wider ranges and so are more likely to hit resonances with particular stand components. For exemplary purposes only, frequencies lower than ordinary hearing range are desirably induced, producing a sensory feeling that enhances an experience. As is well known in the loudspeaker industry, the production of low frequency vibrations requires much more massive components. These components, which are supported at some distance from the stand base, must also be supported by the stand in a safe and stable manner. Unfortunately, these low frequency vibrations also can lead to resonance or vibration within stand components, particularly when such stands are adjustable in any manner.

In addition to the problems arising from massive loudspeakers and stand vibration, newer challenges have also arisen in the industry. In many venues, sound has emanated from speaker arrangements to produce a simple stereophonic pattern allowing persons to distinguish left and right sounds and shifts that are perceived as movement in this left and right sound field. With proper use of this basic sound field, an audience can perceive a left stage person speaking to a right stage person not only visually, but also auditorily. Subsequent improvements enabled front and rear shifts to be perceived as well, commonly leading to speaker enclosures being dispersed both in front and behind an audience. As may be appreciated, these speaker placements were rarely if ever considered critical, with optimizations focused on basic interactions with adjacent or surrounding fixtures, walls, and ceilings that might generate sound wave reflections.

More recently, more advanced sound reproduction techniques have been devised wherein the precise placement of many speakers typically mounted both high and low can be used to create an extremely life-like three-dimensional auditory experience. One exemplary arrangement using the Dolby Atmos™ technology from Dolby Laboratories, combines 12 speakers high and low permits as many as 128 audio tracks, each assigned particular audio description metadata that determines how the sound will be distributed within a sound stage. This metadata is then used based upon the available speakers to calculate out a best or most realistic reproduction. As may be appreciated, more sound sources enable an audience to be more realistically immersed into the surrounding sound. However, best reproduction of the sounds for a larger sound stage and audience requires far greater care and precision in the placement of the loudspeakers than early stereophonic sound systems.

In the case of Dolby Atmos™, and other three-dimensional sound reproduction techniques and systems such as Apple Spatial Audio, Ambisonic, the need for many precisely placed and massive loudspeakers has heretofore limited such three-dimensional sound stages or studios to a very expensive and fixed structure that can cost millions of dollars to install. Unfortunately, this in turn means that a suitable sound stage or studio is designed, installed once in a permanent manner, and all future sound presentations are restricted to the layout that was created for the first presentation. Consequently, if a sound stage or studio is limited or defective in any way at the time of initial installation, which it will almost certainly be as technology progresses, then updating the sound stage for a new layout appropriate to a different sound presentation will be very difficult and expensive. Furthermore, most stage, convention, and demo performances cannot convert an existing multi-purpose facility into a Dolby Atmos™ sound facility and back, due to the very high cost and required labor. As may then be appreciated, the applications for a Dolby Atmos™ sound facility have heretofore been undesirably limited to very static special purpose structures and buildings, such as high-end movie theaters, some high-end studios, and the like.

In consideration of the foregoing, the ability to provide a stable, substantially non-resonant, adjustable, and easily relocated stand suitable for large, massive speaker enclosures is in great demand. Frequently, a plurality of stands will be required, such as, for exemplary purposes but not limited thereto, in the case of a musical or theatrical performance where different performers or different parts of a stage or screen are preferred to be either illuminated or coupled into an audio or loudspeaker system. As noted, this is particularly true in the case of a Dolby Atmos™ sound stage.

Depending upon the particular item to be supported, the stand may have several requirements which must be met to perform satisfactorily. Among these, one common requirement is the ability to readily and rapidly reposition the article support, and then subsequent to the repositioning, anchor the article support into a new fixed position. This ability to readily and rapidly reposition the article permits the stand to be placed at a convenient location along the ground or floor. Once the base is roughly located, then the article support may be moved into proper alignment. When any of the moving joints or connections are adjusted into new position, it is most desirable for the positions to be arrived at smoothly, and then locked into place without significant change of position during locking.

Since the article support may rise a significant distance from the base, it is generally desirable to incorporate significant mass into the base, to provide some measure of stability during movement or adjustment of the article support and subsequent thereto to best maintain stable location of the article. Unfortunately, in the prior art this often led to the use of a large and very massive base, typically of disc, slightly domed, or similar shape. Such a base is not readily transported, nor can it be used or stored in close arrangement with other bases. Consequently, it is not possible to tightly and compactly arrange, use or store a plurality of similar stands.

While the application for the stand will to some degree potentially affect the various dimensions and some of the configurations not only of the base, but of the stand as well, including such things as particular lengths or dimensions of the base and the stand, most desirably a stand will offer substantial flexibility in both application and physical arrangement and positioning. This flexibility is a desirable part of the benefits of such a stand, which is in part what separates such a stand from a fixture or anchored support.

The present inventor has had the good fortune to be either directly named or peripherally associated with the development of a number of very beneficial inventions in the sound industry, including slides for stringed musical instruments, folding stands, and boom stands. Inclusive of these are U.S. Pat. No. 7,207,532 by Roberts et al, entitled "Boom stand"; U.S. Pat. No. 7,635,109 by Roberts et al, entitled "Boom stand"; U.S. Pat. No. 7,819,367 by Roberts et al, entitled "Boom stand"; U.S. Pat. No. 9,516,400 by Roberts et al, entitled "Boom stand stacking counterweights"; U.S. Pat. No. 10,584,824 by Roberts et al, entitled "Folding base"; the teachings of each which are incorporated herein by reference. These stands offer a number of benefits not found in other prior art stands, including: stability; acoustic damping; and ready, precise, and stable positioning. Nevertheless, these aforementioned stands still lack the capability of providing stable support and the adjustability required for a sophisticated 3-dimensional sound stage.

Patents to other stands of which the present inventor is aware, and including patents and published applications cited in the aforementioned patents that the US Patent Office has variously considered relevant for one reason or another, the teachings and contents which are incorporated herein by reference, include: U.S. Pat. No. 275,050 by Keller, entitled "Jointed gun rod"; U.S. Pat. No. 964,353 by Whittier, entitled "Rotary well boring box and pin"; U.S. Pat. No. 1,593,415 by Perkins, entitled "Stand"; U.S. Pat. No. 1,610,414 by Bernard et al, entitled "Safety coupled drilling joint"; U.S. Pat. No. 1,625,266 by Mast, entitled "Rod coupling"; U.S. Pat. No. 1,663,356 by Smith, entitled "Curtain pole"; U.S. Pat. No. 1,721,690 by Daniele, entitled "Folding stand"; U.S. Pat. No. 1,780,039 by Pechan, entitled "Tripod head"; U.S. Pat. No. 1,863,756 by Lufkin, entitled "Portable stand"; U.S. Pat. No. 1,942,925 by Jenkins, entitled "Portable boom support"; U.S. Pat. No. 2,083,091 by Rector, entitled "Joint seal"; U.S. Pat. No. 2,110,037 by De Rosa, entitled "Adjustable bracket"; U.S. Pat. No. 2,111,368 by Kron, entitled "Tilting camera support"; U.S. Pat. No. 2,113,852 by Meade, entitled "Line clamp"; U.S. Pat. No. 2,170,006 by Brandt, entitled "Base construction"; U.S. Pat. No. 2,263,668 by Woodworth, entitled "Microphone support"; U.S. Pat. No. 2,292,140 by Lofgren, entitled "Electric cord holder"; U.S. Pat. No. 2,479,720 by Brandt, entitled "Extension lamp support"; U.S. Pat. No. 2,613,901 by Tatar, entitled "Portable and collapsible support for musical instruments"; U.S. Pat. No. 2,613,902 by Loken, entitled "Tripod leg connection"; U.S. Pat. No. 2,630,289 by Selig, entitled "Bass violin folding stand"; U.S. Pat. No. 2,634,075 by Mayzel, entitled "Stand"; U.S. Pat. No. 2,691,501 by Spencer, entitled "Tripod support"; U.S. Pat. No. 2,723,431 by Di Renzo, entitled "Clamping and holding device for flexible hose"; U.S. Pat. No. 2,760,744 by Watrous, entitled "Standard constructions"; U.S. Pat. No. 2,780,282 by Cox, Jr., entitled "Screen stand and case"; U.S. Pat. No. 2,873,079 by Carogana et al, entitled "Adjustable stand"; U.S. Pat. No. 2,970,798 by Fritchle et al, entitled "Laboratory clamps"; U.S. Pat. No. 3,028,133 by Craig, entitled "Baby bottle holder"; U.S. Pat. No. 3,074,748 by Ulrich, entitled "Threaded pipe connection"; U.S. Pat. No. 3,180,602 by Monell, entitled "Adjustable conveyor stand"; U.S. Pat. No. 3,232,613 by Laube, Jr., entitled "Two-piece cue stick"; U.S. Pat. No. 3,239,874 by Sperzel, entitled "Friction hinge"; U.S. Pat. No. 3,357,041 by Brueder, entitled "Braking device for holding a pivot pin against motion"; U.S. Pat. No. 3,436,482 by Pless et al, entitled "Microphone assembly with self-contained power supply"; U.S. Pat. No. 3,454,252 by Morgan et al, entitled "Vibration damping construction for long pole arms"; U.S. Pat. No. 3,486,514 by Prescott, entitled "Canopy support"; U.S. Pat. No. 3,698,328 by Weir, entitled "Reading tables"; U.S. Pat. No. 3,783,262 by Pile, entitled "Portable surgical lamp"; U.S. Pat. No. 3,789,213 by Sonneman, entitled "Counterbalanced lamp"; U.S. Pat. No. 3,790,773 by Sapper, entitled "Lamp with an articulated support"; U.S. Pat. No. 3,994,464 by Perbal et al, entitled "Internally wired counter-balanced bracket"; U.S. Pat. No. 4,258,708 by Gentile, entitled "Articulated positioning system for devices adapted to externally exert a holding action on bone tissues"; U.S. Pat. No. 4,364,535 by Itoh et al, entitled "Counterbalance mechanism for laser knife device"; U.S. Pat. No. 4,396,807 by Brewer, entitled "Microphone mounting device"; U.S. Pat. No. 4,407,472 by Beck, entitled "Hose handler-keeper"; U.S. Pat. No. 4,465,255 by Hill, entitled "Bedside book holder"; U.S. Pat. No. 4,592,797 by Carlson, entitled "Tool for finishing taped dry wall joints"; U.S. Pat. No. 4,596,484 by Nakatani, entitled "Lock for telescoping tubular support"; U.S. Pat. No. 4,671,479 by Johnson et al, entitled "Adjustable support apparatus"; U.S. Pat. No. 4,712,762 by Liedle, entitled "Adjustable reusable adapter system for temporary electric service"; U.S. Pat. No. 4,715,571 by Soltow et al, entitled "Device for securing a plurality of electrical conductors or cables"; U.S. Pat. No. 4,782,428 by Lowell et al, entitled "Collapsible fluorescent light for photography"; U.S. Pat. No. 4,840,345 by Neil, entitled "Clips with overlapping engagement members"; U.S. Pat. No. 4,900,184 by Cleveland, entitled "Stirrup clip"; U.S. Pat. No. 4,905,946 by Wang, entitled "Adjustable leg assembly"; U.S. Pat. No. 4,923,156 by Linneusson, entitled "Stand"; U.S. Pat. No. 4,993,961 by Hisatomi et al, entitled "Ignition plug socket"; U.S. Pat. No. 5,060,894 by Hillinger, entitled "Stand with collapsible legs"; U.S. Pat. No. 5,082,222 by Hsu, entitled "Supporting device"; U.S. Pat. No. 5,102,079 by Lee, entitled "Connecting assembly for a tripod"; U.S. Pat. No. 5,112,046 by Thorpe, entitled "Billiard cue device"; U.S. Pat. No. 5,124,857 by Pitz, entitled "Vehicular light monitoring apparatus"; U.S. Pat. No. 5,126,928 by Hughes, entitled "Mobile boom-mounted shop light"; U.S. Pat. No. 5,137,237 by Haskins, entitled "Star-shaped base for a support stand"; U.S. Pat. No. 5,154,381 by Malinao, entitled "Microphone boom holder"; U.S. Pat. No. 5,156,508 by Grisley, entitled "Cam action clamp"; U.S. Pat. No. 5,192,963 by Hill, entitled "Camera suspension apparatus"; U.S. Pat. No. 5,320,312 by Hoenninger, entitled "Cable cluster mount"; U.S. Pat. No. 5,340,066 by Ditch, entitled "Stand for article"; U.S. Pat. No. 5,340,068 by Sarkisian et al, entitled "Release mechanism for locking pivotable leg"; U.S. Pat. No. 5,464,083 by Arnold et al, entitled "Torque limiting spring hinge"; U.S. Pat. No. 5,490,599 by Tohidi, entitled "Long multi-position microphone support stand"; U.S. Pat. No. 5,501,419 by Huang, entitled "Chair leg assembly with three legs"; U.S. Pat. No. 5,503,356 by Shelby, entitled "Folding target stand"; U.S. Pat. No. 5,542,505 by Kempf, entitled "Torque limiting device with restraining mechanism"; U.S. Pat. No. 5,558,501 by Wang et al, entitled "Portable ceiling fan"; U.S. Pat. No. 5,611,508 by Palmero, entitled "Horizontally adjustable microphone support"; U.S. Pat. No. 5,638,579 by Tenney, entitled "Friction tilt mechanism"; U.S. Pat. No. 5,697,125 by Gannon, entitled "Clip friction hinge"; U.S. Pat. No. 5,739,447 by Hoshino, entitled "Attachment and detachment of a weight to a boom cymbal stand"; U.S. Pat. No. 5,769,556 by Colley, entitled "Bicycle clamp"; U.S. Pat. No. 5,771,539 by Wahlstedt et al, entitled "Torsion friction spring hinge"; U.S. Pat. No. 5,771,540 by Carpenter et al, entitled "Equilibrated hinge with variable frictional torque"; U.S. Pat. No. 5,787,549 by Soderlund, entitled "Torsion rod hinge with friction dampening"; U.S. Pat. No. 5,806,819 by Martone, entitled "Clip-type fastening device with clamping means securable about a fixed member"; U.S. Pat. No. 5,876,011 by Blasing, entitled "Utility stand having threaded adjusting apparatus"; U.S. Pat. No. 5,946,874 by Roberts, entitled "Connector assembly for coplanar display panels"; U.S. Pat. No. 5,947,706 by Gapinski, entitled "Hand operated floor pump with retractable stand"; U.S. Pat. No. 6,007,032 by Kuo, entitled "Foldable stand assembly for microphones"; U.S. Pat. No. 6,084,549 by Pensjo et al, entitled "Retractable tripod antenna"; U.S. Pat. No. 6,101,678 by Malloy et al, entitled "Adjustable handle for a manually movable vehicle"; U.S. Pat. No. 6,131,868 by Welling et al, entitled "Hospital bed communication and control device"; U.S. Pat. No. 6,182,580 by Barrett et al, entitled "Mobile connectable furniture, a connector therefor and method of connection"; U.S. Pat. No. 6,241,552 by Pan, entitled "Connecting structure type (III) of electrical wires and bulb units of a decorative lighting net"; U.S. Pat. No. 6,305,659 by Metelski, entitled "Stand, in particular a microscope stand"; U.S. Pat. No. 6,367,749 by Valiulis, entitled "Stand base"; U.S. Pat. No. 6,386,413 by Twyford, entitled "Apparatus and method for mounting a computer system in a vehicle"; U.S. Pat. No. 6,504,707 by Agata et al, entitled "Portable computer"; U.S. Pat. No. 6,530,123 by Wahlstedt, entitled "Clip friction hinge with housing"; U.S. Pat. No. 6,651,943 by Cho et al, entitled "LCD monitor stand"; U.S. Pat. No. 6,662,731 by Teppo et al, entitled "Nestable table with slotted table top"; U.S. Pat. No. 6,783,462 by Costain, entitled "Cue stick joint"; U.S. Pat. No. 7,048,241 by Crain et al, entitled "Geomatic support having hinged legs with hinge lock"; U.S. Pat. No. 7,147,191 by Ichikawa et al, entitled "Display tilting apparatus"; U.S. Pat. No. 7,207,537 by Hung, entitled "Support apparatus for suspending a display"; U.S. Pat. No. 7,232,098 by Rawlings et al, entitled "Stand for supporting a display in multiple orientations and a display used in combination with said stand"; U.S. Pat. No. 7,240,881 by Crain et al, entitled "Geomatic support having hinged legs with hinge lock"; U.S. Pat. No. 7,320,450 by Carnevali, entitled "Configurable mounting apparatus"; U.S. Pat. No. 7,389,965 by Oddsen et al, entitled "Tapered mini arm having an anti-loosening mechanism"; U.S. Pat. No. 7,514,619 by Bruce, entitled "Adjustable musician's stand"; U.S. Pat. No. 7,832,803 by Cassaday, entitled "Headrest linkage"; U.S. Pat. No. 8,118,272 by Liou, entitled "Link rod type adjustable screen fixing apparatus"; U.S. Pat. No. 8,122,629 by Cowgill, entitled "Collapsible sign"; U.S. Pat. No. 8,136,780 by Lin, entitled "Auxiliary securely holding device for electronic appliance"; U.S. Pat. No. 8,152,402 by Wylde et al, entitled "Flexible peripheral device positioner"; U.S. Pat. No. 8,235,334 by Kobal, entitled "Tablet computer holder and support"; U.S. Pat. No. 8,240,628 by Huang, entitled "Holding apparatus"; U.S. Pat. No. 8,459,599 by Du et al, entitled "Support stand for supporting electronic device"; U.S. Pat. No. 8,523,476 by Billings, entitled "Positioning and damper device using shear force from cyclic differential compressive strain of a cross-linked thermoplastic"; U.S. Pat. No. 8,636,257 by Tsou et al, entitled "Support device"; U.S. Pat. No. 8,727,290 by De La Matta et al, entitled "Flat touch screen mounting system and method"; U.S. Pat. No. 8,800,942 by Yu, entitled "Supporting apparatus for electronic device"; U.S. Pat. No. 8,833,716 by Funk et al, entitled "Tablet mounting systems and methods"; U.S. Pat. No. 8,864,089 by Hung, entitled "Holding device"; U.S. Pat. No. 8,875,348 by Kossett, entitled "Friction hinge system"; U.S. Pat. No. 8,918,931 by Baker et al, entitled "Bed accessory"; U.S. Pat. No. 9,167,192 by Eoh, entitled "Display system"; U.S. Pat. No. 9,933,001 by Gardiner, entitled "Clamp assembly"; 2004/0135040 by Eason, entitled "Microphone support boom movement control apparatus and method with differential motion isolation capability"; 2005/0151039 by Hsu, entitled "Multifunctional holder"; 2005/0161561 by Hsieh, entitled "Locking device for a telescopic tube assembly"; 2006/0120550 by McCann, entitled "Integrated microphone stand and pedal board"; 2007/0107580 by Vleugels, entitled "Friction torque capo"; 2007/0212162 by Schank et al, entitled "Shearing-force mechanism with cross-linked thermoplastic"; 2007/0234517 by Larson et al, entitled "Overmolded hinge with insert washers"; 2007/0278050 by Larson et al, entitled "Toe position control"; 2008/0253601 by Hilderman, entitled "Microphone stand"; 2008/0303275 by Johnson, entitled "Threaded connection"; 2011/0167986 by Hennessey, entitled "Equipment stand"; 2011/0197803 by May, entitled "Color guard adjustable flag pole weight"; 2012/0049024 by Smith, entitled "Wall quick mounting device"; 2012/0170194 by Lord et al, entitled "Mobile computer stand"; 2014/0059805 by Krahn et al, entitled "Friction hinge system"; 2014/0232104 by Bernardi, entitled "Fitting for a heat pump and method of installation"; 2014/0374550 by Straeter, entitled "Ground mounted solar power assembly"; 2015/0102187 by Hennessey, entitled "Retention and rotation assembly and method of using the same"; 2015/0365752 by Mcintosh, entitled "Support structures for music components, comprising integrated DI"; 2016/0053934 by Hennessey, entitled "Microphone stand having articulating shaft"; U.S. Des Pat. No. 366,169 by Huang, entitled "Pedestal base for a chair"; U.S. Des Pat. No. 383,927 by Vassallo, entitled "Wheeled base for chairs, armchairs, tables, coat-stands"; U.S. Des Pat. No. 653,066 by Henderson, entitled "Positionable tablet holder"; U.S. Des Pat. No. 668,495 by Henderson, entitled "Cup holder supported positionable tablet holder";

As may be apparent, in spite of the enormous advancements and substantial research and development that has been conducted, none of these many aforementioned patents and published applications address the very challenging requirements of a three-dimensional sound stage. Consequently, there has remained a need and demand for such a portable stand.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a speaker stand and at least one loudspeaker enclosure. The at least one loudspeaker enclosure comprises at least one enclosure, and at least one loudspeaker supported by the enclosure, the loudspeaker configured to generate an audible sound when excited by an appropriate electrical signal. The speaker stand comprises: a base having a centered upright coupler; an upright having a base coupler coupled to the centered upright coupler, a lower vertical riser rising vertically from the base coupler and defining a first vertical riser longitudinal axis, an upper vertical riser parallel with and axially offset from the first vertical riser longitudinal axis and defining a second vertical riser longitudinal axis, and an angled intermediate riser connecting the lower and upper vertical risers together; and at least one speaker coupler selectively reciprocal along the second vertical riser longitudinal axis, selectively rotatable about the second vertical riser longitudinal axis, and suspending the at least one loudspeaker enclosure from the upper vertical riser with a center of mass of the at least one loudspeaker enclosure in line with the first vertical riser longitudinal axis.

OBJECTS OF THE INVENTION

Exemplary embodiments of the present invention solve inadequacies of the prior art by providing an upright having a lower vertical riser defining a first vertical riser longitudinal axis, an upper vertical riser parallel with and axially offset from the first vertical riser longitudinal axis, and an angled intermediate riser connecting the lower and upper vertical risers together. A novel clamp couples the loudspeaker enclosure to the upper vertical riser, while providing three displaced axes of rotation for the loudspeaker enclosure, two that are parallel to the lower vertical riser longitudinal axis and one angularly offset thereto, and two axes of reciprocation. The radial offset of the loudspeaker from the upper vertical riser clamp centers the mass of the speaker enclosure with the lower vertical riser longitudinal axis.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to support one or more speaker enclosures vertically above the ground or floor level upon a single stand. A second object of the invention is to respect the design and configuration of the speaker enclosure, and to thereby obtain all benefit that might be derived therefrom. Another object of the present invention is to center the mass of the one or more speaker enclosures with the center of the speaker stand base. A further object of the invention is to provide three displaced axes of rotation for the loudspeaker enclosure, two that are parallel to the lower vertical riser longitudinal axis and one angularly offset thereto, and at least one and preferably two axes of reciprocation to offer substantial flexibility in both application and physical arrangement and positioning. This flexibility is a desirable part of the benefits of such a stand, which is in part what separates such a stand from a fixture or anchored support. As a corollary thereto, an object of the present invention is to provide precise placement of many speakers typically mounted both high and low, to create an extremely life-like three-dimensional auditory experience. Yet another object of the present invention is to provide rigid and secure rapidly and precisely adjustable couplings between the one or more speaker enclosures and the stand that are acoustically neutral or dampening, so as to avoid vibrations and resonance within the stand that might otherwise interfere with sound quality of the combination speaker stand and one or more loudspeaker enclosures. A further object of the present invention is to provide a base that is readily and quickly adapted to different loads carried upon the stand.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
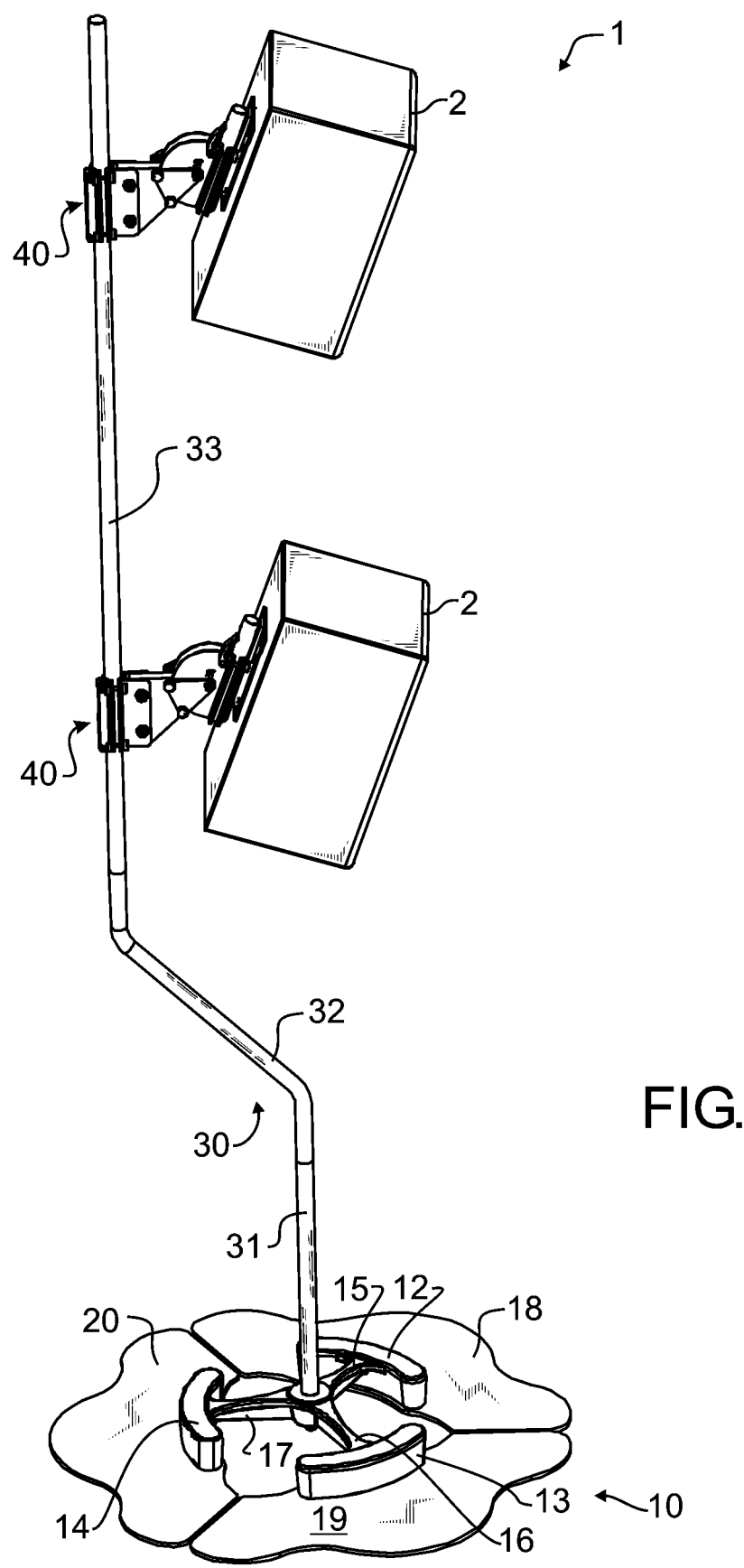
FIG. 1 illustrates a preferred embodiment speaker stand designed in accord with the teachings of the present invention from a primarily side elevational view, but with slight top projection to better capture the features of the invention.

Manifested in the preferred embodiment, the present invention provides a speaker stand 1 comprising a base 10, upright 30, and quick release speaker coupler 40 that may, for exemplary purposes, be used to support one or more massive prior art loudspeaker enclosures 2.

Figure 2:
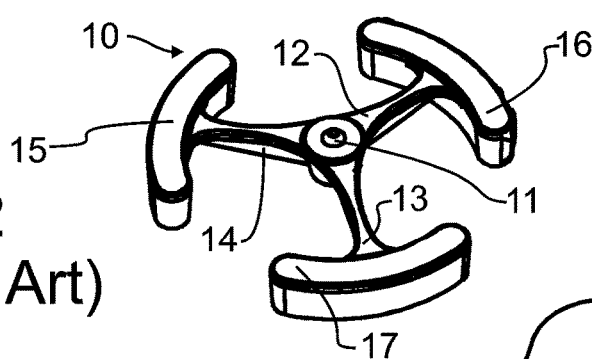
FIG. 2 illustrates a prior art massive and nestable base from top and side projected view that is used in some speaker stand embodiments in accord with the teachings of the present invention.
Figure 3:
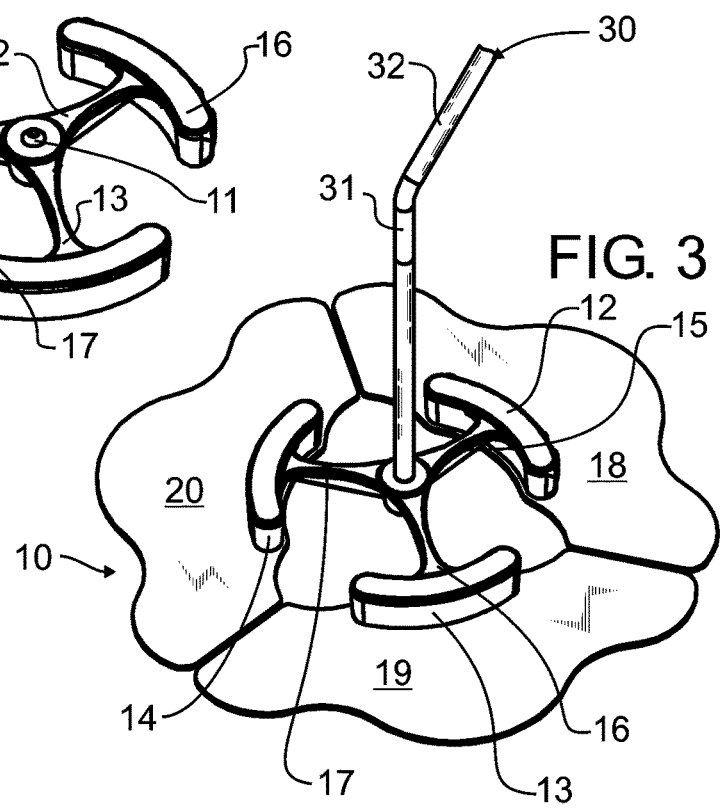
FIG. 3 illustrates a preferred embodiment base designed in accord with the teachings of the present invention and used in the preferred embodiment speaker stand of FIG. 1, from top and side projected view.

Base 10 as illustrated in FIGS. 1-3 most preferably includes three arcuately shaped massive anchors 12, 13, 14 that are extending at the ends of arms 15, 16, and 17 respectively, each distal to the center hole 11 of base 10. Center hole 11 is provided to engage, by thread or other known coupling technique, with an upright such as upright 30. While the number and arrangement of optional contact feet are not critical, six elastomeric feet may for exemplary and non-limiting purpose be provided, one adjacent to each distal end of anchors 12-14, distal from each associated arm 15-17. In the most preferred embodiment, these contact feet are preferably elastomeric, such as from rubber or other similarly resilient compounds, to provide a desired combination of vibration isolation between base 10 and a supporting floor or surface, and also to provide some degree of friction therebetween to provide a more secure anchor. Nevertheless, these rubber or elastomeric feet may be replaced with casters or wheels, which will permit speaker stand 1 to be used in diverse applications where a wheeled stand is preferred.

Base 10 will also have several important dimensional relationships or proportions which offer significant additional utility. As illustrated in FIG. 3 and more fully described in U.S. Pat. Nos. 7,207,532; 7,635,109; and 7,819,367; the teachings which were incorporated herein above by reference, the arcuately shaped massive anchors 12-14 have a length preferably greater than the opening between two adjacent arcuately shaped massive anchors. The length is also most preferably less than the maximum width within an opening bounded by adjacent arcuately shaped massive anchors. By adhering to these ranges, it is possible to stack a plurality of speaker stands 1 in much closer arrangement.

As maybe apparent, to obtain the greatest anchoring capability, it is generally desirable to make arcuately shaped massive anchors 12-14 relatively large, to thereby increase the total mass. The maximum length of arms 15-17 will nevertheless be limited by the extra storage space required to store a larger base 10, and the extra floor space need during use, which when increased may also create a tripping hazard. As is known, as these arms are increased in length, there is a correspondingly greater probability that a person or other object may collide with base 10, potentially toppling preferred embodiment speaker stand 1 or otherwise causing harm or damage. While the spacing between arms 15-17 is illustrated as being such that each arm subtends a one hundred and twenty degree arc with each adjacent arm, the exact spacing is not critical to the invention, nor is the identical size or spacing. While these consistent sizes and angular relationships are preferred since any of the arcuately shaped massive anchors 12-14 may be dropped between like arms of any other like speaker stand base, this is not an essential requisite but merely a significant convenience to better enhance the ease of use of the present invention. Varying sizes and angular relationships which would otherwise force placements in specific orientations are also contemplated herein, though recognized as being generally less desirable. Furthermore, the arcuately shaped massive anchors 12-14 need not be continuous arcs as shown, but may also be further subdivided or may be of irregular geometry. Likewise, the mounting of arms 15-17 to arcuately shaped massive anchors 12-14, which in the preferred embodiment base 1 places the legs arms 15-17 at midpoints of each arcuately shaped massive anchors 12-14, is similarly optional and may be varied to place the arms at any reasonable supporting orientation.

Upright 30 preferably is provided with at least two bends therein, dividing upright 30 into three portions. A lower generally vertical riser 31 is configured to be affixed securely into center hole 11. An angled intermediate riser 32 connects lower generally vertical riser 31 to upper generally vertical riser 33, but creates an offset so that vertical riser 33 does not align above center hole 11. Instead, vertical riser 33 is off axis from the center of base 10 to put the center of mass of loudspeaker enclosures 2 in the middle of speaker stand 1, most preferably centered over center hole 11.

While only one upright 30 is illustrated in the drawings, it will be understood herein that in some alternative embodiments multiple uprights 30 will be provided on one base 10. Upright 30 defines an orientation direction through the offset of angled intermediate riser 32, and may further be provided with an orientation line or similar indicia on it to assist in aligning loudspeakers 2 facing forward. In some embodiments, graduation markings are provided on preferred embodiment speaker stand 1 to provide references for use by an installer or others, including for exemplary and non-limiting purpose graduations indicating tilt, height, and offset. Most preferably, upright 30 will also be provided with safety stops wherever required or appropriate.

FIGS. 1 and 3 illustrate base 10 modified from that of prior art FIG. 2 for use in combination with the present invention. As illustrated in FIGS. 1 and 3, stability plates 18-20 are affixed to arcuately shaped massive anchors 12-14. Stability plates 18-20 are most preferably rigid, either by the properties of the material used or by the geometry of the plates. In addition to being rigid, stability plates 18-20 may in some embodiments be provided with beveled edges, as long as the resulting edges are rounded and not sharp. By beveling the edges, the risk of consequential interference between stability plates 18-20 and persons or other objects, animate or otherwise, is reduced. In the event of contact therebetween, the beveling will help shift the object up and over the impacted stability plate. Further, and as illustrated, stability plates 18-20 can have artistic geometries, are preferably fully circumscribing anchors 12-14, and define a circumference about those anchors.

While there are many suitable techniques known in the mechanical arts for selectively affixing stability plates 18-20 to arcuately shaped massive anchors 12-14, a most preferred method is by bolting directly into threaded holes provided in arcuately shaped massive anchors 12-14 where contact feet, casters, or wheels would otherwise be affixed. The resulting combination base 10 and stability plates 18-20 such as illustrated by FIGS. 1 and 3 has an expanded footprint over that of FIG. 2, but in a low profile way that does not present a significant tripping hazard to persons walking past preferred embodiment speaker stand 1. Further, when the extra mass and diameter provided by stability plates 18-20 is not needed, including during transport from sound stage to sound stage, the stability plates 18-20 are readily removed, thereby reducing the handling weight and storage space required, in turn easing the handling, set-up, and breakdown of preferred embodiment speaker stand 1.

Figure 4:
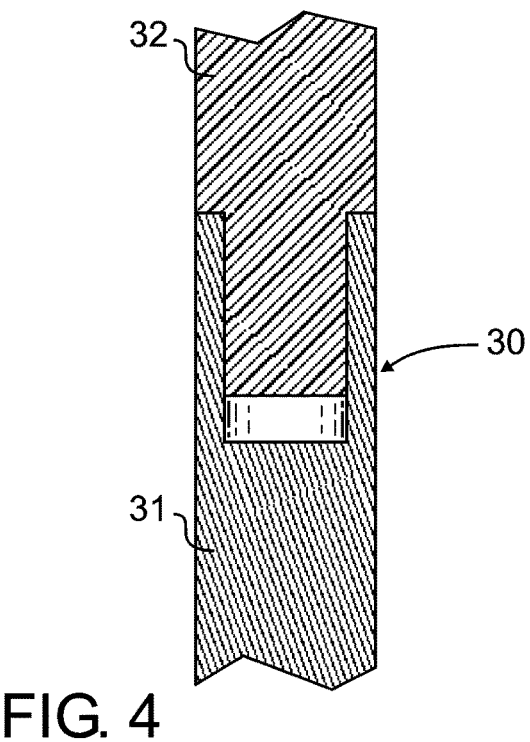
FIG. 4 illustrates a riser coupler used in the preferred embodiment speaker stand of FIG. 1 from an enlarged sectional view.

FIG. 4 illustrates one suitable and exemplary coupling between risers 31 and 32 within upright 30, as used in the preferred embodiment speaker stand 1. It will be appreciated that the threaded male-female coupling illustrated can be replaced by any of the myriad of suitable end-to-end couplings known in the mechanical arts generally. In alternative embodiments, upright 30 may also be fabricated as a single integral component rather than from separate distinct portions.

Figure 5:
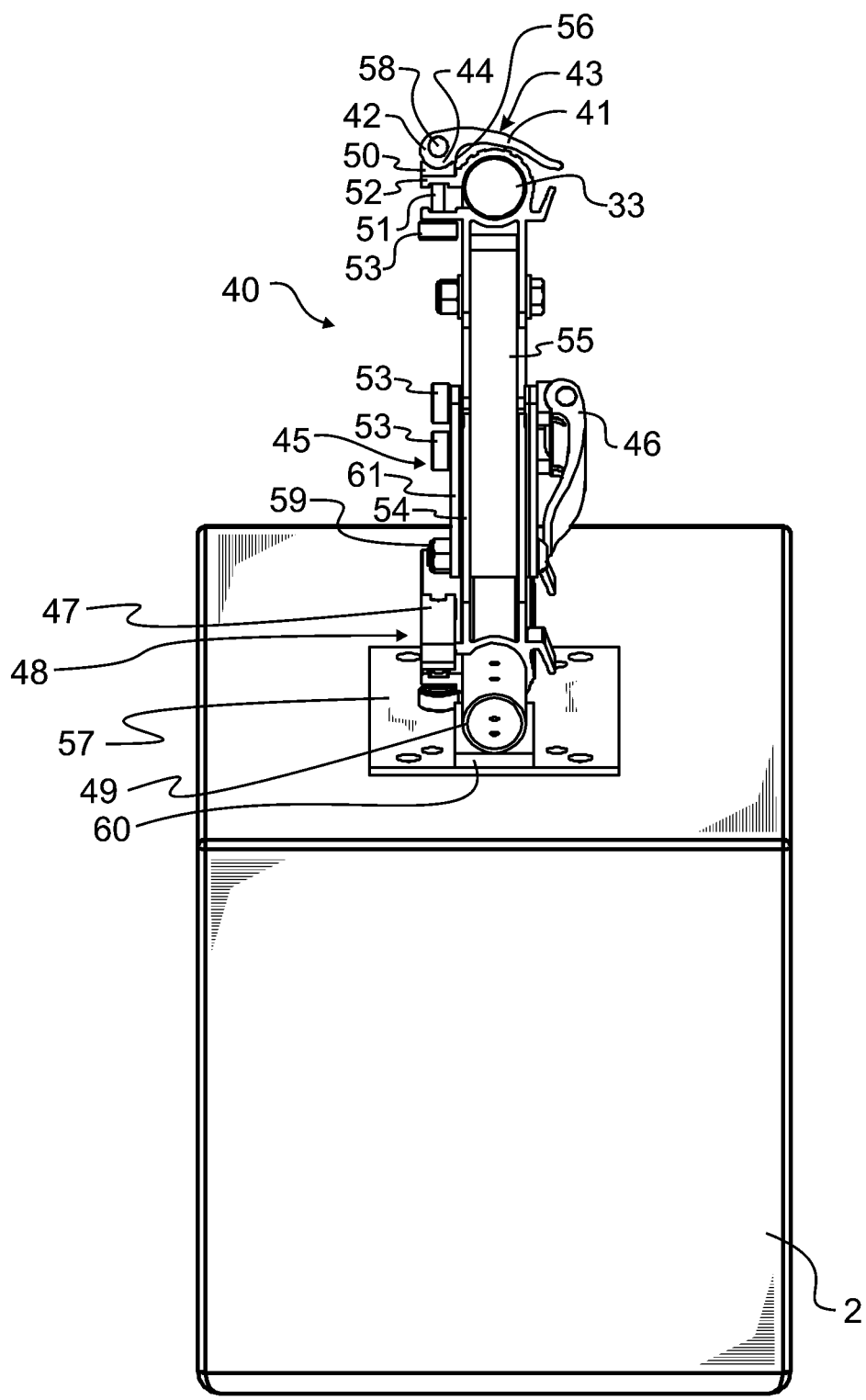
FIG. 5 illustrates the preferred embodiment speaker stand of FIG. 1 from a top plan view, looking directly down onto the upper vertical riser.
Figure 6:
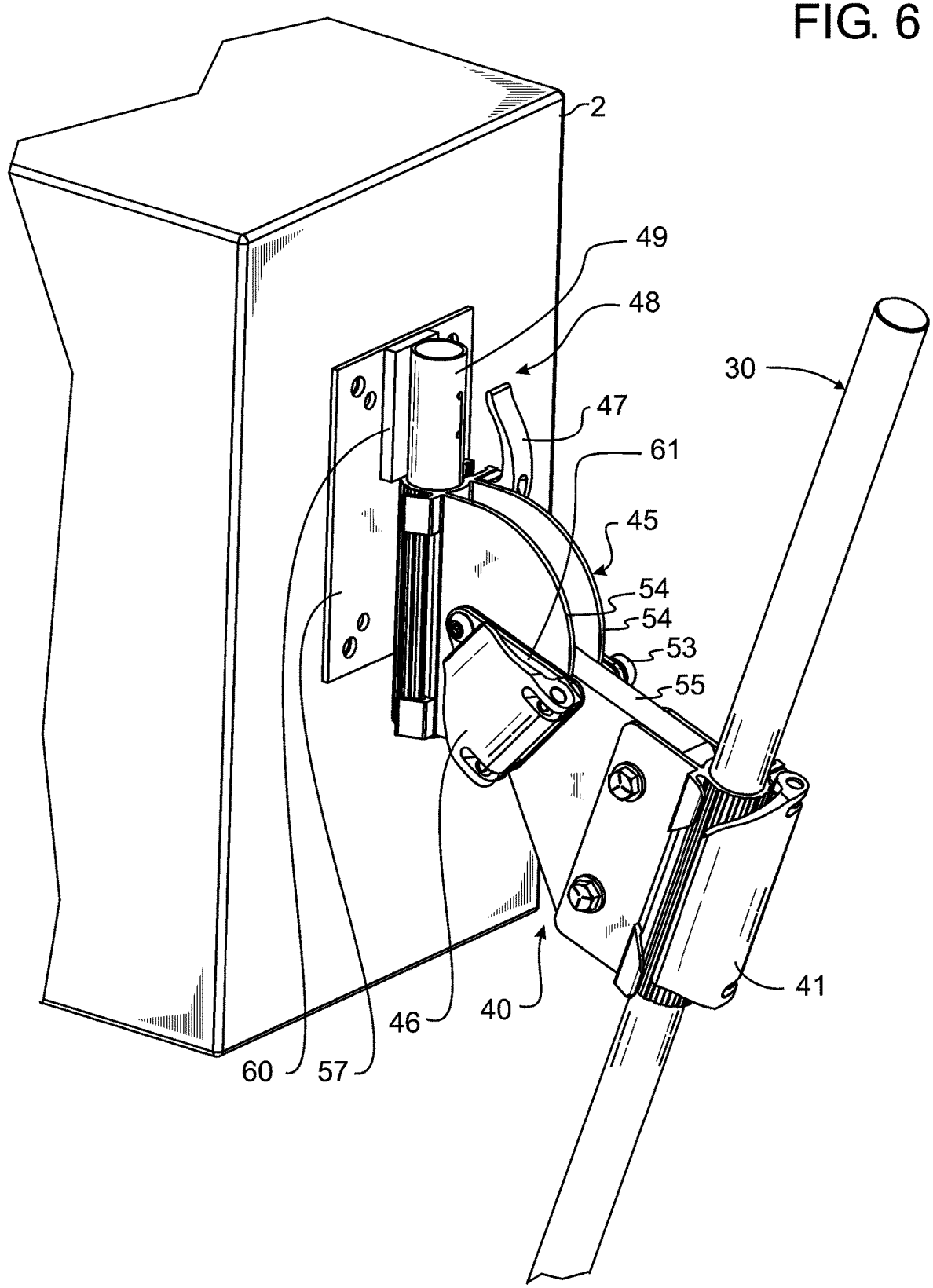
FIG. 6 illustrates an enlarged and projected view of a preferred combination prior art loudspeaker enclosure, quick release coupler, and upright used in the preferred embodiment speaker stand of FIG. 1, from top and side projected view.
Figure 7:
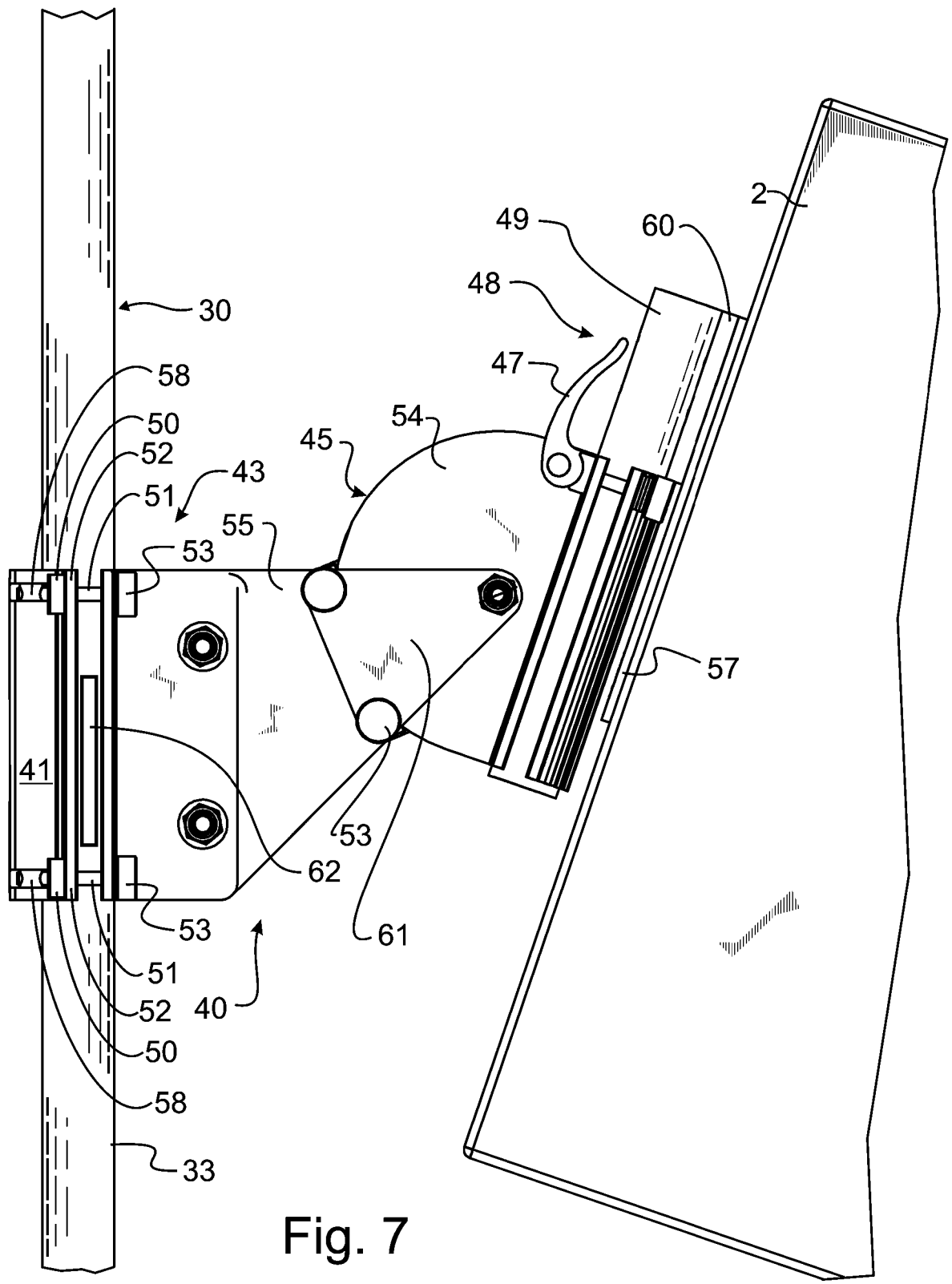
FIG. 7 illustrates an enlarged view of a preferred combination prior art loudspeaker enclosure, quick release coupler, and upright used in the preferred embodiment speaker stand of FIG. 1, from side elevation view.

FIGS. 5-7 illustrate a preferred combination loudspeaker enclosure 2, quick release speaker coupler 40, and upright 30. Most preferably, quick release speaker coupler 40 includes a pole coupler 43, rotary clamp 45, and loudspeaker enclosure clamp 48. Pole coupler 43 is an over-center clamp that with operation of handle 41 is used to lock about upright 30. Likewise, loudspeaker enclosure clamp 48 is an over-center clamp that with operation of handle 47 locks about a slide bar 49 that is rigidly affixed to a speaker enclosure clamp mounting plate 57 secured directly to loudspeaker enclosure 2.

When handle 41 is pivoted from an open position to the closed position illustrated in FIGS. 5-7, accomplished by rotation of handle 41 in a clockwise direction about pin 58 as illustrated in FIG. 5, this moves different portions of handle 41 into alignment between pin 58 and slide block 15. As visible in FIG. 5, when handle 41 is in the illustrated closed position, a relatively thicker cam portion 44 is located therein. However, when handle 41 is rotated in a counter-clockwise direction about pin 28 in the illustration, this will move narrower cam portion 42 into the space between pin 28 and slide block 50. Since bolt 51 is fixed in length between bolt head 53 and pin 58, the rotary motion of handle 41 will be translated into that of a cam. The opening into U-shaped clamp 52 will expand and the portion closest to handle 41 will shift toward pin 58 when handle 41 is in the fully counterclockwise rotation or open position, with narrower cam portion 42 in the space between pin 58 and slide block 50. In contrast, the opening into U-shaped clamp 52 will contract when handle 41 is in the fully clockwise or closed position illustrated, with thicker cam portion 44 in the space between pin 58 and slide block 50. Since U-shaped clamp 52 circumscribes upper vertical riser 33, contracting the opening into U-shaped clamp 52 by clockwise rotation of handle 41 as illustrated will cause U-shaped clamp 52 to tighten around upper vertical riser 33.

Bolt head 53 serves as an adjuster to determine the extent of spacing at the opening into U-shaped clamp 52, both when handle 41 is in an open counterclockwise rotation not illustrated, or in the illustrated closed clockwise rotated position. Consequently, in some embodiments bolt 51 will be rotatable, to allow minor adjustment to be made, for exemplary and non-limiting purpose during a setup on a sound stage. While bolt 51 having a rotatable bolt head 53 is illustrated in the preferred embodiment, other suitable adjusters may be substituted therefore, and may for exemplary purposes include pins, various spacers such as pairs of wedge-shaped washers that may be rotated relative to each other, and any other equivalents known in the mechanical arts.

The reason pole coupler 43 is referred to herein as an over-center clamp is because of the particular offset of pin 58 generated by the geometry of the handle 41 cam surface. If shaped properly, thicker cam portion 44 reaches maximum width, considered to be the center point, just prior to handle 41 being rotated fully clockwise to the closed position. This means that when handle 41 is fully rotated, passing beyond center or "over-center", slide block 50 will lift just slightly away from U-shaped clamp 52. In other words, in order for handle 41 to be released (opened from the closed position of FIGS. 5-7), there is a brief increase in force required to rotate handle 41 counterclockwise away from the fully closed position of FIGS. 5-7, passing again back through center, and to thereby move over the widest part of thicker cam portion 44, before starting on the progressively narrow width until reaching narrower cam portion 42. This brief increase in force helps to keep handle 41 in the closed position of FIGS. 5 and 6, and provides tactile feedback to a user so that they know that pole coupler 43 has been securely locked. Optionally, but preferably, a rotary stop 56 is formed into handle 41 that protrudes or is thicker in a sudden, step-wise fashion. When handle 41 is rotated full clockwise, this rotary stop 56 is sufficiently thick to mechanically interfere with slide block 50 and thereby prevent any further rotation.

Handle 41 controls pole coupler 43, and is thereby used to adjust height by sliding or reciprocating along the generally vertical axis defined by upper vertical riser 33. In addition, handle 41 also controls panning by controlling rotation of quick release speaker coupler 40 about the longitudinal axis of upper vertical riser 33.

While only one slide block 50 and bolt 51 are clearly visible in FIGS. 5 and 6, it will be understood that one or more such combinations will be provided. The forces generated by the relatively long lever arm of handle 41 compared to the short arm defined by thicker cam portion 44 creates very substantial clamping force about upper vertical riser 33. Nevertheless, and in accord with the preferred embodiment, the substantial mass of many loudspeaker enclosures 2 such as would be used together with the present invention and embodiments thereof will in at least some of those embodiments dictate the use of at least two bolts 51, for exemplary and non-limiting purposes located at the top and bottom ends of an installed pole coupler 43 as revealed in FIG. 7.

Handle 47 controls loudspeaker enclosure clamp 48 and thereby provides rapid release and securement to loudspeaker enclosure 2. Loudspeaker enclosure clamp 48 actuated by handle 47 preferably has similar function and operation as pole coupler 43 actuated by handle 41, and so is not separately detailed herein. However, there is one very notable difference between pole coupler 43 and loudspeaker enclosure clamp 48 that enables some difference in construction. Speaker enclosure clamp mounting plate 57 has a slide bar 49 rigidly affixed thereto by securing an intermediate spacer block 60 between. Best visible in FIGS. 6 and 7, the upper portion of slide bar 49 cannot pass down into the U-shaped coupler of loudspeaker enclosure clamp 48 because of the mechanical interference between the U-shaped clamp of loudspeaker enclosure clamp 48 with spacer block 60. This in turn very beneficially means that loudspeaker enclosure 2 can be slipped into loose engagement with loudspeaker enclosure clamp 48 when handle 47 is in a disengaged position. While not rigid, when reasonably vertically oriented as shown in the Figures loudspeaker enclosure clamp 48 will provide hands-free support of loudspeaker enclosure 2. Because spacer block 60 acts as a vertical travel limit stop, loudspeaker enclosure clamp 48 may be designed to carry less load and instead only provide rigidity and rotational locking. Consequently, less load is at least required to be carried by loudspeaker enclosure clamp 48, some instead being distributed to spacer block 60. Owing to this notable difference, in preferred embodiment speaker stand 1 only a single bolt 51 is deemed necessary for loudspeaker enclosure clamp 48.

Handle 46 controls rotary clamp 45 and thereby provides lever lock adjustment for tilt of loudspeaker enclosure 2 about a horizontal axis defined by rotary clamp rotational axis pintle 59. Rotary clamp rotational axis pintle 59 may comprise any suitable bearing or bushing structure, such as a shoulder bolt, rivet, sleeve and bolt combination, or any of the other myriad of known pintles. Since loudspeaker enclosure 2 is large and massive relative to rotary clamp 45, there will be substantial torque generated that must be resisted to secure and fix the position of loudspeaker enclosure 2. As noted herein above, not only must the toque be resisted, but the very purpose of a loudspeaker is to also generate vibration that will further compound the torque.

Rotation of loudspeaker enclosure 2 about a horizontal axis generally perpendicular to the longitudinal axis of vertical riser 33 is selectively provided for and prevented by rotary clamp 45. Rotary clamp 45 allows loudspeaker enclosure 2 to be locked into place at any angle about the rotary clamp rotational axis pintle 59. Rotary clamp plates 54 are frictionally locked into place about rotary clamp core 55 by the tightening rotation of handle 46.

In a manner similar to pole coupler 43, a pivot pin, bolt, and handle 46 provide an over-center clamp which, through the pivotal motion of handle 46, may be used to apply a locking force to draw opposed fixed clamp plates 61 together about rotary clamp plates 54 and rotary clamp core 55. This compression squeezes each of layers into high frictional contact with each other, thereby preventing the rotation of rotary clamp plates 54 about pintle 59. Pintle 59, fixed clamp plates 61, and rotary clamp core 55 are all held stationary relative to each other and pole coupler 43.

Handle 46 operates as a cam, just as handle 41 operates. Bolts 51 are threaded a particular distance into the pin, and therefore define a fixed distance. As handle 46 is rotated, rotary clamp plates 54 are pulled tighter against, or released from, rotary clamp core 55 and fixed clamp plates 61, depending on the direction of rotation of handle 46. Just as with handle 41 and pin 58, with suitable offset of the pin in handle 46, there will be a maximum force (center) pulling fixed clamp plates 61 about rotary clamp plates 54 and rotary clamp core 55 just prior to handle 46 locking in the position illustrated in FIGS. 5-7, followed by a slight drop in this force (over-center) when in the locked position of these same Figures. Again, as with clamp 41, this provides tactile feedback to a user so that they know that rotary clamp 45 has been securely locked, while simultaneously making it more difficult for handle 46 to accidentally be released. Finally, and as with clamp 41, this may also optionally be used by the user or by factory preset to create controlled friction, to permit rotation only when a sufficient rotary force has been applied.

In some alternative embodiments, an elastomeric washer or disc may be provided between rotary clamp plates 54 and either or both of rotary clamp core 55 and fixed clamp plates 61, to simultaneously provide greater resistance to rotation and easier tightening. However, such additional materials increase the manufactured cost and tend to reduce reliability, and so are reserved for alternative embodiments that will particularly benefit from such materials. Otherwise, the materials and surface finish of rotary clamp plates 54, fixed clamp plates 61, and rotary clamp core 55 are selected to provide appropriate friction when handle 46 is in the locked position.

Rotary clamp 45 comprises a set of layers resembling a sandwich, two of which are the rotary clamp plates 54 that rotate relative to the remaining layers. As may be recognized then, in some alternative embodiments only a single rotary clamp plate 54 will be required. In these alternative embodiments, the expected mass of loudspeaker enclosure 2 or otherwise the load emanating therefrom will be relatively lower. In other alternative embodiments, there may be more than two rotary clamp plates 54, where an even greater load is anticipated than the illustrated two plates 54 can safely accommodate.

The geometry of fixed clamp plates 61, and potentially handle 46, will in conjunction with loudspeaker enclosure clamp 48 determine the maximum amount of angular rotation about pintle 59. At one extreme of rotation, mounting plate 57 will approach a parallel position with one side of the V-shaped periphery of fixed clamp plates 61 and the likewise V-shaped rotary clamp core 55, at which point the U-shaped clamp surrounding slide bar 49 will contact the edge of fixed clamp plates 61 and rotary clamp core 55. At the other extreme of rotation, mounting plate 57 will approach a parallel position with the other side of the V-shaped periphery of fixed clamp plates 61 and rotary clamp core 55, at which point the U-shaped clamp surrounding slide bar 49 will contact this other edge of fixed clamp plates 61 and rotary clamp core 55. Consequently, the maximum rotation of loudspeaker enclosure 2 is limited to 180 degrees of travel less the angle defined by the V-shaped periphery of fixed clamp plates 61 and rotary clamp core 55, or approximately 135 degrees in preferred embodiment quick release speaker coupler 40. As may be appreciated, a sharper V-shape for fixed clamp plates 61 and rotary clamp core 55 will increase the maximum rotation angle. Nevertheless, the approximate 135 degrees in preferred embodiment quick release speaker coupler 40 is much more than required for most applications.

While the flexibility and precision afforded by all three clamps described herein is preferred, those skilled in the art of sound stages will recognize that some applications may not require such extensive flexibility and precision. Consequently, some alternative embodiments will forego one or more of the three clamps provided in preferred embodiment speaker stand 1.

To use preferred embodiment speaker stand 1, a person will first transport the stand 1 and loudspeaker enclosure 2 to an appropriate venue. As noted herein above, preferred embodiment speaker stand 1 will typically either be fully assembled, or at least only partially assembled to the major components including: base 10 with or without stability plates 18-20; upright 30; and quick release speaker coupler 40 during transit. Once at the venue, and if preferred embodiment speaker stands 1 have been partially disassembled, they will be reassembled and located appropriately to define the sound stage. Next, loudspeaker enclosures 2 will be coupled to preferred embodiment speaker stands 1. While a person has great latitude in the sequence of assembly, other options than those presented herein are possible. Nevertheless, because spacer block 60 enables loudspeaker enclosures 2 to be hung from loudspeaker enclosure clamp 48 and left there in a hands-free manner for any subsequent final positioning, one or more quick release speaker couplers 40 will most commonly be at least roughly located on and attached to upright 30. As noted herein above, upright 30 can support more than one loudspeaker enclosure 2, in no small part due to the centering of the loudspeaker enclosure mass over center hole 11 of base 10. It is for this purpose of centering the mass that the indicia described above marking speaker orientation is provided. In addition, and as illustrated in FIG. 7, where a massive prior art loudspeaker enclosure 2 is expected to be supported, a pole coupler alignment key 62 visible in FIG. 7 may be affixed to and protrude from vertical riser 33, thereby limiting rotation of the enclosure and avoiding unbalancing speaker stand 1. Nevertheless, there will also be embodiments where a first loudspeaker enclosure 2 on riser 33 is rotated in a first direction about the vertical axis of riser 33 away from aligned with center hole 11, but is counterbalanced by a second loudspeaker enclosure 2 rotated in a second opposite direction about the vertical axis of riser 33.

Once the desired quick release speaker couplers 40 are in approximate or even final position, then loudspeaker enclosure clamps 48 are opened by rotating handle 47 to the unsecured position. Loudspeaker enclosures 2 are then hung from loudspeaker enclosure clamps 48 by manipulating loudspeaker enclosure 2 to align slide bar 49 with loudspeaker enclosure clamp 48 and engaging the two by lowering slide bar 49 into loudspeaker enclosure clamp 48. Handle 47 may then be rotated to a locking position. Adjustments can be easily made to the position of each loudspeaker enclosure 2 as required, by unlocking rotation of a suitable handle 41, 46, 47, repositioning, and subsequent locking rotation of the same handle.

The combination of pole coupler 43, rotary clamp 45, and loudspeaker enclosure clamp 48 provide tremendous capacity for precise positioning, while ensuring once the position is set, that it is also secured and will be retained, even with massive loudspeaker enclosures 2 and the inherent vibration. Pole coupler 43 allows reciprocation along the vertical axis of upper vertical riser 33 and rotation about the same vertical axis. Rotary clamp 45 allows selective tilting, meaning rotation about a horizontal axis defined by rotary clamp rotational axis pintle 59. Finally, speaker coupler 49 locks quick release speaker coupler 40 to speaker enclosure clamp mounting plates 57 that are preferably pre-installed to each loudspeaker enclosure 2. Loudspeaker enclosure 2 is rotatable about slide bar 49. Though less commonly desired or required, reciprocation of slide bar 49 within loudspeaker enclosure clamp 48 is also possible. Critically, the operation of each of pole coupler 43, loudspeaker enclosure clamp 48, and rotary clamp 45 is self-evident and intuitive, greatly facilitating proper use of quick release speaker coupler 40 and preferred embodiment speaker stand 1.

While the foregoing details what is felt to be the preferred and a variety of alternative embodiments of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a speaker stand and at least one loudspeaker enclosure,
   said at least one loudspeaker enclosure comprising:
     at least one enclosure;
     at least one loudspeaker supported by said enclosure, said loudspeaker configured to generate an audible sound when excited by an appropriate electrical signal;
   said speaker stand comprising:
     a base having a centered upright coupler;
     an upright having
       a base coupler coupled to said centered upright coupler;
       a lower vertical riser rising vertically from said base coupler and defining a first vertical riser longitudinal axis,
       an upper vertical riser parallel with and axially offset from the first vertical riser longitudinal axis and defining a second vertical riser longitudinal axis, and
       an angled intermediate riser connecting the lower and upper vertical risers together; and
     at least one speaker coupler selectively reciprocal along said second vertical riser longitudinal axis, selectively rotatable about said second vertical riser longitudinal axis, and suspending said at least one loudspeaker enclosure from said upper vertical riser with a center of mass of said at least one loudspeaker enclosure in line with said first vertical riser longitudinal axis.

2. The combination speaker stand and at least one loudspeaker enclosure of claim 1, wherein said speaker coupler further comprises:
   a pole coupler circumscribing and mechanically coupled with said upper vertical riser;
   a loudspeaker enclosure clamp mechanically coupled with said at least one loudspeaker enclosure; and
   a rotary clamp interposed between said pole coupler and said loudspeaker enclosure clamp.

3. The combination speaker stand and at least one loudspeaker enclosure of claim 2, wherein said pole coupler is configured to selectively actuate between a first locked state rigidly coupling said pole coupler to said upper vertical riser and a second adjustable state allowing said pole coupler to move axially along said second vertical riser longitudinal axis and to rotate about said second vertical riser longitudinal axis.

4. The combination speaker stand and at least one loudspeaker enclosure of claim 3, further comprising a pole coupler actuation handle, said pole coupler selectively actuated between said first locked state and said second adjustable state by rotation of said pole coupler actuation handle between a first rotary position and a second rotary position.

5. The combination speaker stand and at least one loudspeaker enclosure of claim 4, wherein said pole coupler actuation handle further comprises a cam.

6. The combination speaker stand and at least one loudspeaker enclosure of claim 5, further comprising a U-shaped clamp circumscribing said upper vertical riser, said pole coupler actuation handle cam tensioning said U-shaped clamp tightly about said upper vertical riser when said actuation handle is in said first rotary position and releasing tension in said U-shaped clamp when said actuation handle is in said second rotary position.

7. The combination speaker stand and at least one loudspeaker enclosure of claim 6, wherein a maximum tension in said U-shaped clamp is attained when said handle is intermediate between said first and second rotary positions.

8. The combination speaker stand and at least one loudspeaker enclosure of claim 2, wherein said rotary clamp is configured to selectively actuate between a first locked state rigidly coupling said pole coupler to said loudspeaker enclosure clamp and a second adjustable state allowing said loudspeaker enclosure clamp and said at least one loudspeaker enclosure to rotate relative to said pole coupler.

9. The combination speaker stand and at least one loudspeaker enclosure of claim 8, further comprising a rotary clamp actuation handle, said rotary clamp selectively actuated between said first locked state and said second adjustable state by rotation of said rotary clamp actuation handle.

10. The combination speaker stand and at least one loudspeaker enclosure of claim 9, wherein said rotary clamp actuation handle further comprises a cam.

11. The combination speaker stand and at least one loudspeaker enclosure of claim 10, further comprising:
    a speaker enclosure clamp mounting plate rigidly affixed to said at least one loudspeaker enclosure;
    at least one rotary clamp plate rigidly affixed to said speaker enclosure clamp mounting plate and having a first major surface and a second major surface opposed to said first major surface;
    at least one rotary clamp core rigidly affixed to said pole coupler and immediately adjacent to said at least one rotary clamp plate first major surface;
    at least one fixed clamp plate immediately adjacent to said at least one rotary clamp plate second major surface, said at least one rotary clamp core and said at least one fixed clamp plate together capturing at least one portion of said at least one rotary clamp plate therebetween;
    a rotary clamp rotational axis pintle passing through said at least one rotary clamp core and said at least one rotary clamp plate and defining an axis of rotation of said at least one rotary clamp plate relative to said at least one rotary clamp core;
    said rotary clamp actuation handle cam applying a force driving said at least one fixed clamp plate toward said at least one rotary clamp core and thereby securely engaging said at least one portion of said at least one rotary clamp plate with each of said at least one fixed clamp plate and said at least one rotary clamp core to restrict relative rotation between said at least one rotary clamp core and said at least one rotary clamp plate when said rotary clamp actuation handle is in said first rotary position, and releasing said at least one fixed clamp plate from said at least one rotary clamp core and thereby permitting relative rotation between said at least one rotary clamp core and said at least one rotary clamp plate when said rotary clamp actuation handle is in said second rotary position.

12. The combination speaker stand and at least one loudspeaker enclosure of claim 11, wherein said force driving said at least one fixed clamp plate toward said at least one rotary clamp core reaches a maximum when said rotary clamp actuation handle is intermediate between said first and second rotary positions.

13. The combination speaker stand and at least one loudspeaker enclosure of claim 2, wherein said loudspeaker enclosure clamp is configured to selectively actuate between a first locked state rigidly coupling said at least one loudspeaker enclosure to said rotary clamp and a second adjustable state configured to allow removal of said at least one loudspeaker enclosure from said loudspeaker enclosure clamp.

14. The combination speaker stand and at least one loudspeaker enclosure of claim 13, wherein said at least one loudspeaker enclosure is configured to remain supported by said loudspeaker enclosure clamp when in said second adjustable state until lifted therefrom.

15. The combination speaker stand and at least one loudspeaker enclosure of claim 1, wherein said base comprises:
   a plurality of arms radiating from said centered upright coupler;
   a plurality of anchors, individual ones of said plurality of anchors affixed to said individual ones of said plurality of arms distal to said centered upright coupler; and
   a plurality of stability plates, individual ones of said plurality of stability plates affixed to and selectively removable from said individual ones of said plurality of anchors.

16. The combination speaker stand and at least one loudspeaker enclosure of claim 15, wherein said individual ones of said plurality of stability plates are rigid and have a nominal thickness.

17. The combination speaker stand and at least one loudspeaker enclosure of claim 16, wherein said plurality of stability plates extend radially farther from said centered upright coupler than said plurality of anchors.

18. The combination speaker stand and at least one loudspeaker enclosure of claim 17, wherein said plurality of stability plates define a circumference about said plurality of anchors.

19. In combination, a loudspeaker support, at least one loudspeaker enclosure, and a speaker enclosure clamp, said speaker enclosure clamp comprising:
   a speaker enclosure clamp mounting plate rigidly affixed to said at least one loudspeaker enclosure;
   a spacer block rigidly affixed to said speaker enclosure clamp; and
   a slide bar rigidly affixed to and spaced from said speaker enclosure clamp by said spacer block;
   a slide bar clamp rigidly coupled to said loudspeaker support and configured to selectively actuate between a first locked state rigidly coupling said slide bar to said loudspeaker support and a second adjustable state configured to allow removal of said slide bar from said slide bar clamp;
   wherein said at least one loudspeaker enclosure is configured to remain supported by said loudspeaker enclosure clamp when said slide bar clamp is in said second adjustable state until said at least one loudspeaker enclosure is lifted therefrom.

* * * * *